(12) United States Patent
Chen et al.

(10) Patent No.: US 12,484,124 B2
(45) Date of Patent: Nov. 25, 2025

(54) BOOST CONVERTER POWER STAGE CIRCUIT

(71) Applicant: National Taiwan University, Taipei (TW)

(72) Inventors: Ching-Jan Chen, Taipei (TW); Chieh-Ju Tsai, Taipei (TW); Sheng-Han Yu, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 90 days.

(21) Appl. No.: 18/406,457

(22) Filed: Jan. 8, 2024

(65) Prior Publication Data

US 2025/0119995 A1    Apr. 10, 2025

(30) Foreign Application Priority Data

Oct. 6, 2023 (TW) .................................. 112138619

(51) Int. Cl.
| | | |
|---|---|---|
| *H05B 45/35* | (2020.01) | |
| *H02M 1/00* | (2007.01) | |
| *H02M 3/07* | (2006.01) | |
| *H02M 3/158* | (2006.01) | |

(52) U.S. Cl.
CPC .......... *H05B 45/35* (2020.01); *H02M 1/0095* (2021.05); *H02M 3/07* (2013.01); *H02M 3/158* (2013.01)

(58) Field of Classification Search
None
See application file for complete search history.

(56) References Cited

U.S. PATENT DOCUMENTS

| | | | |
|---|---|---|---|
| 9,265,121 B2 * | 2/2016 | Lee | .......... H05B 45/60 |
| 2022/0376616 A1 * | 11/2022 | Hu | ............ H02M 3/07 |

* cited by examiner

*Primary Examiner* — Crystal L Hammond
(74) *Attorney, Agent, or Firm* — BACON & THOMAS, PLLC

(57) ABSTRACT

The present invention discloses a boost converter power stage circuit, comprising: an organic light-emitting diode power management integrated circuit unit, a switched capacitor converter, and a boost converter, wherein, a flying capacitor is used to boost the voltage of the inductor to twice the voltage, and then the positive voltage of the output voltage source is boosted, and then use the switched capacitor converter to output the voltage in order to obtain the conversion of the negative voltage.

7 Claims, 7 Drawing Sheets

BOOST CONVERTER POWER STAGE CIRCUIT

BACKGROUND OF THE INVENTION

1. Field of the Invention

The present invention relates to a boost converter power stage circuit, particularly concerning a single-inductor bipolar output converter circuit.

2. Description of the Prior Art

Currently, the screens of the smart phones predominantly use the active-matrix organic light-emitting diode (AMO-LED), which feature two sets of independent output voltages. However, a common issue is the discontinuous current supply, leading to the entire poor output efficiency of the output converter, the control loop compensation, the loop bandwidth, and the transient response.

Conventional output converters do not employ switched-capacitor converters, thus necessitating a converter with a better transient response. The boost converter power stage circuit requires multiple inductors to achieve bipolar output. Furthermore, because the output voltage, and current are discontinuous, so that the transfer function has right-half-plane zero, preventing the generation of a better transient response.

Moreover, the conventional output converters are incapable of facilitating cross-regulation for the output converter, and often fail to yield superior performance results. There is indeed a need to propose an improved converter that boasts enhanced capabilities.

Consequently, the industry looks forward to future output converters that will exhibit improved transient responses. Compared to the traditional single-inductor bipolar output converter, the use of a switched-capacitor converter could enable the converter to have much better cross-regulation performance.

SUMMARY OF THE INVENTION

The present invention provides a boost converter power stage circuit, comprising the following component units:

An organic light-emitting diode (OLED) power management integrated circuit unit, which serves to supply electrical power to the organic light-emitting diode (OLED);

A switched-capacitor converter, which is electrically connected to the OLED power management integrated circuit unit;

And, a boost converter, which is electrically connected to the input voltage source, as well as the switched-capacitor converter, and the OLED power management integrated circuit unit. The input voltage source is a kind of direct current voltage source. The boost converter is used to provide a negative voltage for use by the OLED power management integrated circuit unit. The input voltage source is inputted into the boost converter, which then outputs a voltage higher than voltage value of the input voltage source. This output voltage passes through the switched-capacitor converter, to output a negative voltage for use by the OLED power management integrated circuit unit.

One of advantage of the present invention includes a power stage ground, which is electrically connected to the input voltage source.

One of advantage of the present invention is that the boost converter further includes a first power switch, a second power switch, a third power switch, a flying capacitor, and an inductor. The second power switch is electrically connected with the flying capacitor, and the inductor. The first power switch is electrically connected with the third power switch, and the flying capacitor, with the first power switch being grounded. By using the flying capacitor, the voltage of the inductor is doubled, thereby boosting the positive voltage of the output voltage. The switched-capacitor converter is charged and discharged through the flying capacitor, utilizing the output voltage to accomplish the conversion of the negative voltage.

One of advantage of the present invention is that the boost converter further includes a load capacitor, which is electrically connected to the inductor.

One of advantage of the present invention is that when the duty cycle is initiated, the first power switch and the second power switch are turned off, and the third power switch is turned on. The input voltage source increases the voltage of the inductor is doubled, through charging or discharging the flying capacitor, thereby boosting the positive voltage of the output voltage. This output voltage transmits energy to the organic light-emitting diode (OLED) power management integrated circuit unit via the inductor.

One of advantage of the present invention is that when the duty cycle is terminated: the first power switch and the second power switch are turned on, and the third power switch is turned off. The input voltage source, through the output voltage of the flying capacitor, by either charging or discharging the flying capacitor, maintains the output voltage equal to the input voltage source. This output voltage, again, is conveyed through the inductor, transmitting energy to the OLED power management integrated circuit unit.

One of advantage of the present invention is that the switched-capacitor converter includes: a first power switch component, a second power switch component, a third power switch component, a fourth power switch component, a fifth power switch component, a sixth power switch component, a seventh power switch component, and an eighth power switch component.

One of advantage of the present invention is that the switched-capacitor converter includes: a first switching capacitor, a second switching capacitor, a load capacitor, a fourth power stage ground, a load resistor and a third power stage ground, a first power stage ground, a second power stage ground, and a fifth power stage ground.

One of advantage of the present invention is that the switch-capacitor converter includes: the first power switch component electrically connected to the second power switch component, then the second power switch component electrically connected to the third power switch component, then the third power switch component electrically connected to the fourth power switch component. The first power stage grounding is electrically connected between the second and third power switch components. The second power stage grounding is electrically connected to the fifth power switch component, then the fifth power switch component is electrically connected to the sixth power switch component, then the sixth power switch component is electrically connected to the seventh power switch component, and the seventh power switch component is electrically connected to the eighth power switch component. The eighth power switch component is electrically connected to the fifth power stage grounding, thereby outputting the negative drive voltage. One end of the first switching capacitor is electrically connected between the first power switch component and second power switch component, and the other end of the first switching capacitor is electrically connected between the fifth power switch components and sixth power switch component. One end of the second switching capacitor is electrically connected between the third power switch component and fourth power switch component, and the other end of the second switching capacitor is electrically connected between the seventh power switch component and eighth power switch component. The load resistor and the third power stage grounding are electrically connected between the sixth power switch component and seventh power switch component. The load capacitor and the fourth power stage grounding are electrically connected between the sixth power switch component and seventh power switch component. The output end is connected to the load capacitor, and the load resistor.

One of advantage of the present invention is that when the duty cycle is off, the first power switch component, and the fifth power switch component are conductive, while the second power switch component, and the sixth power switch component are turned off. At this moment, the input voltage source charges the first switching capacitor. The third power switch component, and the seventh power switch component are conductive, while the fourth power switch component, and the eighth power switch component are turned off. At this moment, the negative output of the switch-capacitor converter discharges current, passing through the second switching capacitor to ground.

One advantage of the present invention is that when the duty cycle is on, the first power switch component, and the fifth power switch component are turned off, while the second power switch component, and the sixth power switch component are conductive. At this moment, the negative output of the switch-capacitor converter releases current, passing through the first switching capacitor to ground. The third power switch component, and the seventh power switch component are turned off, while the fourth power switch component, and the eighth power switch component are conductive. At this moment, the input voltage source charges the second switching capacitor.

One of advantage of the present invention is that the proposed boost converter power stage circuit is a single-inductor bipolar output converter. By using a flying capacitor to boost the inductor voltage to double the original voltage, thereby enhancing the positive voltage. Then, an interleaved operation of a switch-capacitor converter is utilized to achieve negative voltage conversion by using the output voltage.

One of advantage of the present invention is that the proposed boost converter power stage circuit can achieve bipolar output by using only one inductor.

One advantage of the present invention is that the output current reaches a continuous state, and the transfer function does not have the right-half-plane zero.

One advantage of the present invention is that due to the energy density of the capacitor being greater than the energy density of the inductor, the addition of the flying capacitor for energy conversion results in the reduction of the inductor volume effect, which exceeds the volume increase of the flying capacitor, thereby further enhancing the power density of the boost converter.

One of advantage of the present invention is that compared to conventional output converter, the use of the switch-capacitor converter can result in better cross-regulation performance of the converter.

One of advantage of the present invention is that the invention can improve the overall efficiency of the output converter, control loop compensation, loop bandwidth, and transient response performance to an optimized state.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The following detailed description of the embodiments, in conjunction with the accompanying drawings, which serves to explain the present invention. However, the specific embodiments described are provided for illustrative purposes and are not intended to limit the scope of the present invention. The description of the structure and operation is not intended to limit the order of execution, and any device that achieves equivalent effects through the recombination of components is within the scope of the disclosed content.

Figure 1A:
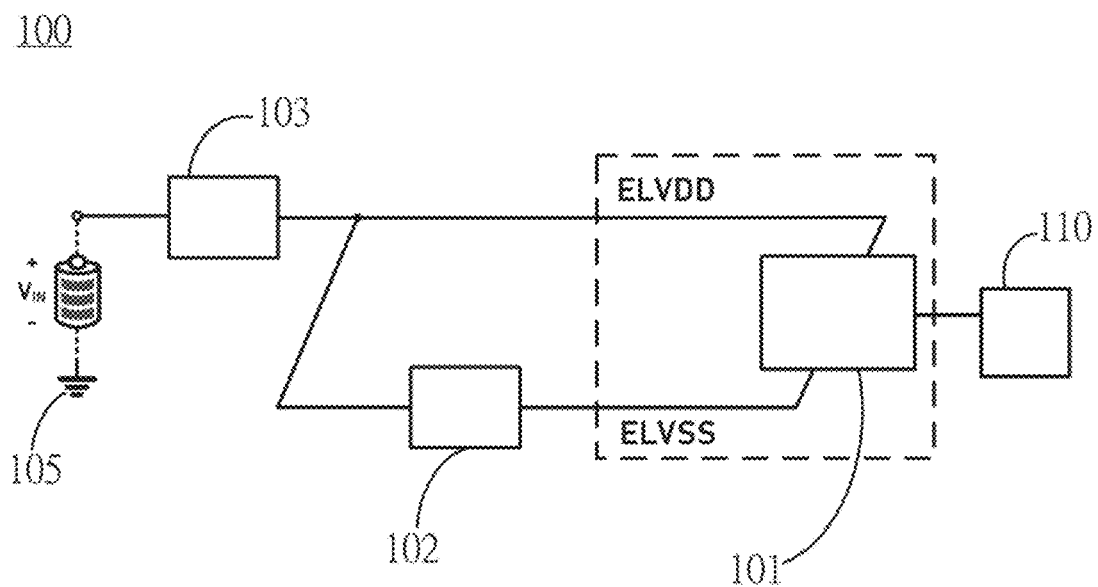
FIG. 1A is a block diagram of the boost converter power stage circuit 100 of the present invention.

Firstly, as shown in FIG. 1A, there is a block diagram of the boost converter power stage circuit 100 according to the present invention. The input voltage source $V_{IN}$ can supply the power, electrically connected to the first power stage ground 105, which includes: an Organic Light Emitting Diode (OLED) power management integrated circuit unit 101, a switch-capacitor converter 102, a boost converter 103, an input voltage source $V_{IN}$, and a first power stage ground 105.

Still referring to FIG. 1A, in the block diagram of the boost converter power stage circuit 100 of the present invention, the OLED power management integrated circuit unit 101 can be used to supply the electrical power to the OLED 110. This OLED power management integrated circuit unit 101 is electrically connected to the switch-capacitor converter 102. The switch-capacitor converter 102 can be electrically connected to the boost converter 103. The boost converter 103 is electrically connected to the input voltage source $V_{IN}$. The OLED power management integrated circuit unit 101 is driven by the positive drive voltage of the output voltage (ELVDD), and this output voltage includes both a positive drive voltage and a negative drive voltage. The power stage ground 105 is electrically connected to the input voltage source $V_{IN}$, and power stage ground 105 provides a reference voltage level.

Figure 1B:
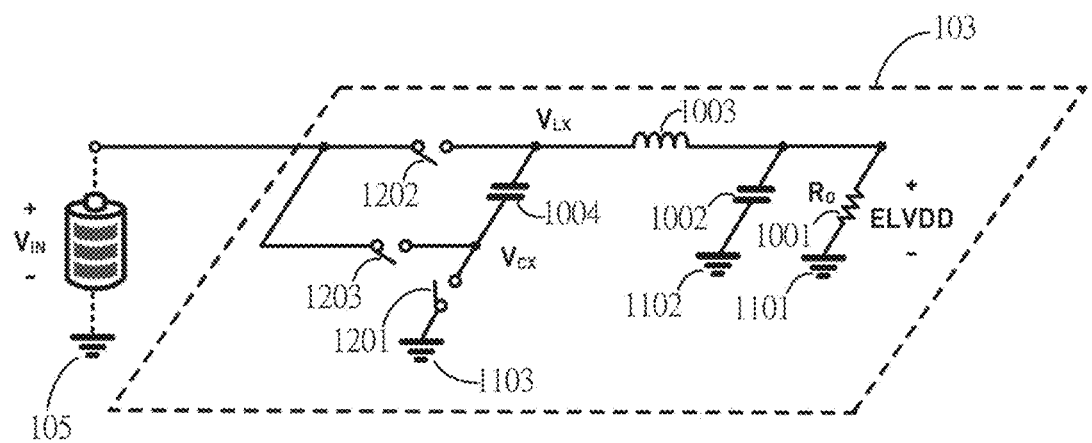
FIG. 1B is a schematic diagram of the structure of the boost converter 103 according to the present invention.

FIG. 1B is a structural diagram of the boost converter 103 according to the present invention. Referring to FIG. 1B, the boost converter 103 includes: a first power switch 1201, a second power switch 1202, a third power switch 1203, a flying capacitor 1004, and an inductor 1003. The second power switch 1202 is electrically connected with the flying capacitor 1004, and the inductor 1003. The first power switch 1201 is electrically connected with the third power switch 1203, and the flying capacitor 1004. The first power switch 1201 is grounded. The voltage of the inductor 1003 is doubled using the flying capacitor 1004, thereby boosting the positive drive voltage of the output voltage. The switch-capacitor converter 102 (as shown in FIG. 1A) charges and discharges through the flying capacitor 1004, utilizing the positive drive voltage of the output voltage, to achieve the conversion of the negative drive voltage (ELVSS). The boost converter 103 (as shown in FIG. 1A) includes a load capacitor 1002, and this load capacitor 1002 is electrically connected to the inductor 1003. Also, power stage ground 1101, power stage ground 1102, and power stage ground 1103 provide a reference voltage level. The load capacitor 1002 is used to stabilize the output voltage value.

Referring again to FIG. 1B, the input voltage source $V_{IN}$ is electrically connected to a DC voltage source. $V_{LX}$, and $V_{CX}$ represent the voltage values of the positive drive voltage, with the load resistor ($R_o$) 1001 electrically connected to the power stage ground 1101. The load capacitor 1002 is electrically connected to the inductor 1003, and, is also electrically connected to the power stage ground 1102. The inductor 1003 is electrically connected to the flying capacitor 1004, and the second power switch 1202. The third power switch 1203 is electrically connected to the first power switch 1201. The second power switch 1202 is electrically connected to the input voltage source $V_{IN}$. The input voltage source $V_{IN}$ is connected to the power stage ground 105. One end of the flying capacitor 1004 is electrically connected to the first power switch 1201, and the power stage ground 1103, while the other end of the flying capacitor 1004 is electrically connected between the inductor 1003 and the second power switch 1202. One end of the third power switch 1203 is electrically connected between the flying capacitor 1004 and the first power switch 1201, and the other end of the third power switch 1203 is electrically connected between the second power switch 1202 and the input voltage source $V_{IN}$. The power stage circuit output end is electrically connected to the load capacitor 1002, and electrically connected to the load resistor 1001, to generate an output of one positive drive voltage. The load resistor 1001 is used to simulate the load of the applied system.

Taking FIG. 1B as an example, $V_{LX}$ refers to the voltage at the $V_{LX}$ point in the diagram. When the duty cycle is off, the $V_{LX}$ voltage is conducted through 1202, reaching the voltage value of $V_{IN}$. Meanwhile, $V_{CX}$ represents the voltage at the $V_{CX}$ point in the diagram. When the duty cycle is off, the $V_{CX}$ voltage is grounded due to the conduction of the first power switch 1201.

Continuing with reference to FIG. 1B, when the duty cycle is on, the $V_{LX}$ voltage is charged through the flying capacitor 1004, reaching twice the voltage value of the input voltage source $V_{IN}$. The $V_{CX}$ voltage reaches the voltage value of the input voltage source $V_{IN}$ due to the conduction of the power switch component 1203.

As indicated in FIG. 1B, the boost converter power stage circuit 100 utilizes the flying capacitor 1004 for charging and discharging, achieving the purpose of boost conversion. Power switch component 1201, power switch component 1202, and power switch component 1203 consist of transistors and the respective driving circuits. The boost converter 103 can be integrated with a switched-capacitor charge pump and a conventional buck converter. This integration serves not only to ensure a rapid load response but also to maintain a low ripple of the output voltage. Furthermore, the boost converter power stage circuit 100 employs the flying capacitor 1004 of the boost converter 103, to elevate the electrical voltage of inductor 1003 to double the initial electrical voltage value, so that this process boosts the positive drive voltage. Subsequently, an interleaved switched-capacitor converter 102 is used, leveraging the positive drive voltage to facilitate the conversion of a negative drive voltage.

Figure 2A:
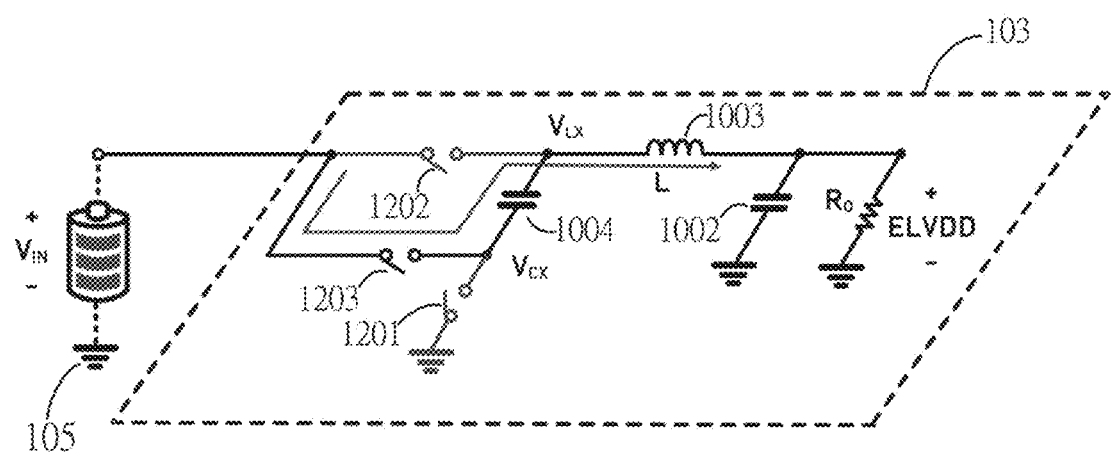
FIG. 2A is a schematic diagram of the structure of the boost converter 103 having the duty cycle off according to the present invention.

FIG. 2A presents the structural diagram of the boost converter 103 of this invention, when the duty cycle is off. Still referring to FIG. 2A, when the duty cycle is on (D=1), the first power switch 1201, and the second power switch 1202 are turned off, while the third power switch 1203 conducts. The input voltage source $V_{IN}$, through the positive drive voltage of the output voltage of the flying capacitor 1004, boosts the voltage of the inductor 1003 by charging or discharging the flying capacitor 1004, thereby doubling the electrical voltage. This action enhances the positive drive voltage of the output voltage, which is transmitted through the inductor 1003, delivering energy to the Organic Light Emitting Diode (OLED) power management integrated circuit unit 101 (as shown in FIG. 1A).

Figure 2B:
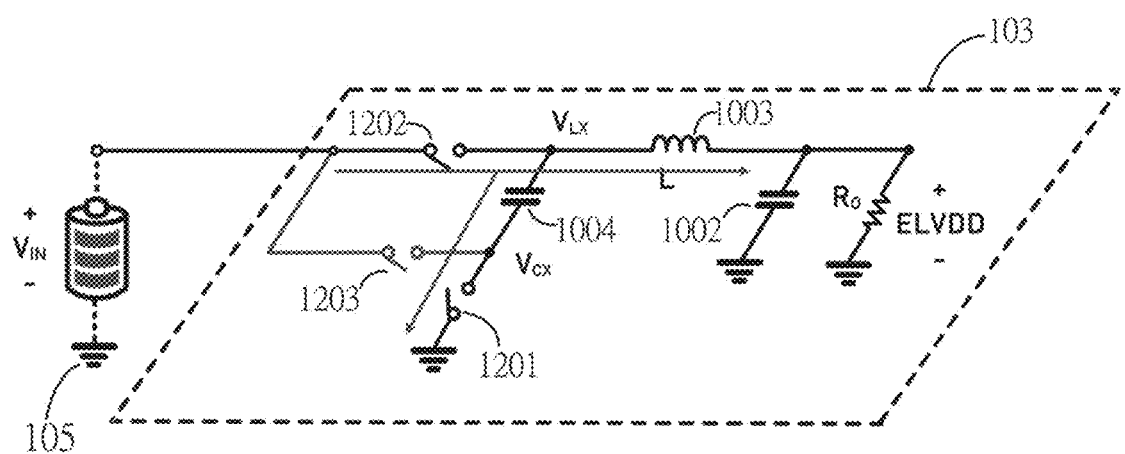
FIG. 2B is a schematic diagram of the structure of the boost converter 103 having the duty cycle on according to the present invention.

Please refer to FIG. 2B, which illustrates the structure of the boost converter 103 of this invention when the duty cycle is on. When the duty cycle is off (D=0), both the first power switch 1201, and the second power switch 1202 conduct, while the third power switch 1203 is turned off. The input voltage source $V_{IN}$, through the positive drive voltage of the output voltage from flying capacitor 1004, which equates the positive drive voltage of the output voltage to the input voltage source $V_{IN}$ by charging or discharging the flying capacitor 1004. This positive drive voltage of the output voltage then transmits energy through the inductor 1003 to the OLED power management integrated circuit unit 101 (as indicated in FIG. 1A).

Figure 3:
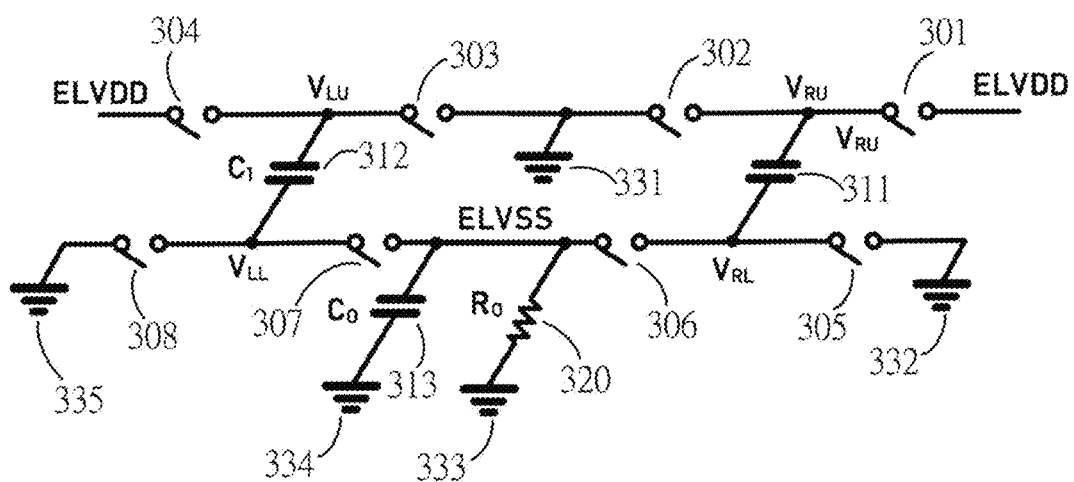
FIG. 3 is a schematic diagram of the structure of the switch-capacitor converter 102 according to the present invention.

Referring to FIG. 3, FIG. 3 is a schematic diagram of the switching-capacitor converter 102 of the present invention. The switching-capacitor converter 102 includes: a first power switch element 301, a second power switch element 302, a third power switch element 303, a fourth power switch element 304, a fifth power switch element 305, a sixth power switch element 306, a seventh power switch element 307, and an eighth power switch element 308.

Still referring to FIG. 3, which is a schematic of the switching-capacitor converter 102 of this invention. The invention includes the first switching capacitor 311, the second switching capacitor 312, the load capacitor 313, and the fourth power stage ground 334. There are also the third power stage ground 333, the first power stage ground 331, the second power stage ground 332, and the fifth power stage ground 335.

Continuing with reference to FIG. 3, which is a schematic of the switching-capacitor converter 102 of the present invention. The first power switch element 301 is electrically connected to the second power switch element 302, and the second power switch element 302 is electrically connected to the third power switch element 303, as well as the third power switch element 303 being electrically connected to the fourth power switch element 304. The first power stage ground 331 is electrically between the second power switch element 302 and the third power switch element 303. The first power stage ground 331, second power stage ground 332, third power stage ground 333, fourth power stage ground 334, and fifth power stage ground 335 provide a reference potential.

Also, as shown in FIG. 3, which is a schematic of the switching-capacitor converter 102 of the present invention. The second power stage ground 332 is electrically connected to the fifth power switch element 305, and the fifth power switch element 305 is electrically connected to the sixth power switch element 306, and the sixth power switch element 306 is electrically connected to the seventh power switch element 307, and the seventh power switch element 307 is electrically connected to the eighth power switch element 308. The eighth power switch element 308 is electrically connected to the fifth power stage ground 335, thereby outputting a negative drive voltage.

Continuing with FIG. 3, which illustrates the architecture of the switching-capacitor converter 102 of this invention. One end of the first switching capacitor 311 is electrically connected between the first power switch element 301, and the second power switch element 302. Another end of the first switching capacitor 311 is electrically connected between the fifth power switch element 305, and the sixth power switch element 306. One end of the second switching capacitor 312 is electrically connected between the third power switch element 303, and the fourth power switch element 304, while another end of the second switching capacitor 312 is electrically connected between the seventh power switch element 307, and the eighth power switch element 308. The load resistor 320 and the third power stage ground 333 are electrically connected between the sixth power switch element 306, and the seventh power switch element 307. The load capacitor 313 and the fourth power stage ground 334 are electrically connected between the sixth power switch element 306, and the seventh power switch element 307, with the output end of the load capacitor 313 connected to the load capacitor 313, as well as to the load resistor 320.

As shown in FIG. 3, which is the architectural diagram of the switching-capacitor converter 102 of this invention, the input voltage source $V_{IN}$ is connected to the boost converter 103, to output a positive drive voltage. The first power switch element 301 is electrically connected to the second power switch element 302, the second power switch element 302 is electrically connected to the third power switch element 303, and the third power switch element 303 is electrically connected to the fourth power switch element 304, thereby outputting a positive drive voltage. The output end of the power stage circuit is connected to the load capacitor 313, and the load resistor 320. The boost converter 103 achieves the conversion of the negative drive voltage through charging and discharging via the flying capacitor 1004.

Figure 4A:
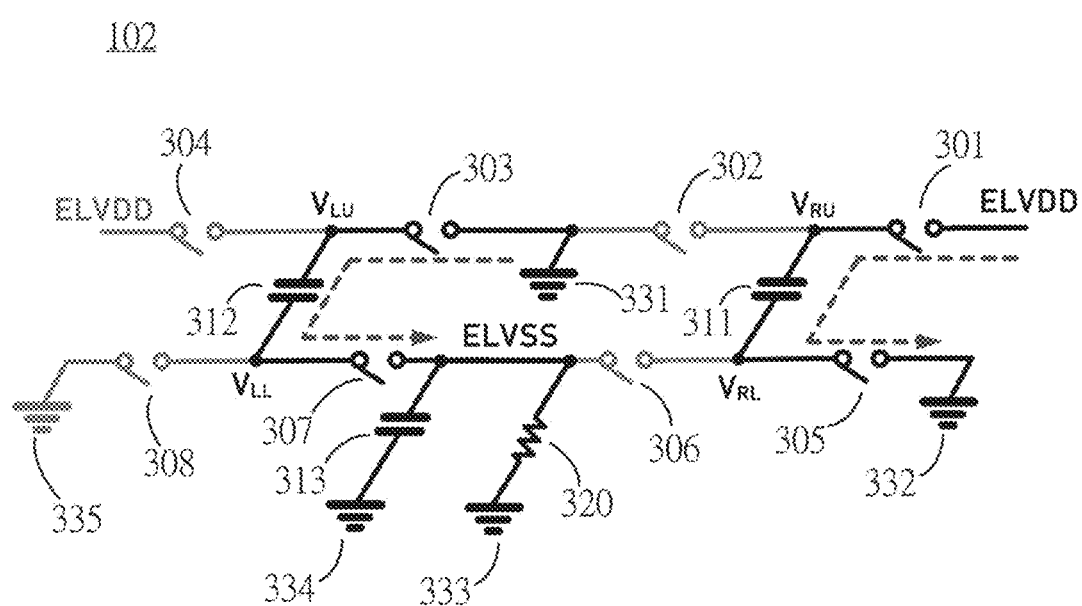
FIG. 4A is a schematic architectural diagram of the switch-capacitor converter 102 having the duty cycle off according to the present invention.

Please refer to FIG. 4A, which is the architectural diagram of the switching-capacitor converter 102 of this invention when the duty cycle is off (D=0). When the duty cycle is off, the first power switch element 301, and the fifth power switch element 305 conduct, while the second power switch element 302, and the sixth power switch element 306 are turned off. At this moment, the input voltage source $V_{IN}$ charges the first switching capacitor 311. The third power switch element 303, and the seventh power switch element 307 conduct, while the fourth power switch element 304, and the eighth power switch element 308 are turned off. At this moment, the negative output of the switching-capacitor converter 102 releases electrical current, through the second switching capacitor 312 to the fourth power stage ground 334.

Please refer to FIG. 4A, which is the architectural diagram of the duty cycle off for the switching-capacitor converter 102 of this invention. $V_{LU}$ represents the voltage at point $V_{LU}$ in the FIG. 4A diagram. When the duty cycle is off, the $V_{LU}$ voltage is grounded through the conduction of the third power switch element 303. $V_{LL}$ is the voltage at point $V_{LL}$, and when the duty cycle is off, the $V_{LL}$ voltage reaches the negative voltage of the negative drive voltage, due to the conduction of the seventh power switch element 307. $V_{RU}$ is the voltage at point $V_{RU}$, and when the duty cycle is off, the $V_{RU}$ voltage reaches the positive drive voltage of the output voltage, due to the conduction of the first power switch element 301. $V_{RL}$ is the voltage at point $V_{RL}$, and when the duty cycle is off, the $V_{RL}$ voltage is grounded due to the conduction of the fifth power switch element 305. Additionally, the negative drive voltage is the electrical voltage at the negative drive voltage point in the FIG. 4A diagram, and which is the negative drive voltage of the output voltage of the converter.

Figure 4B:
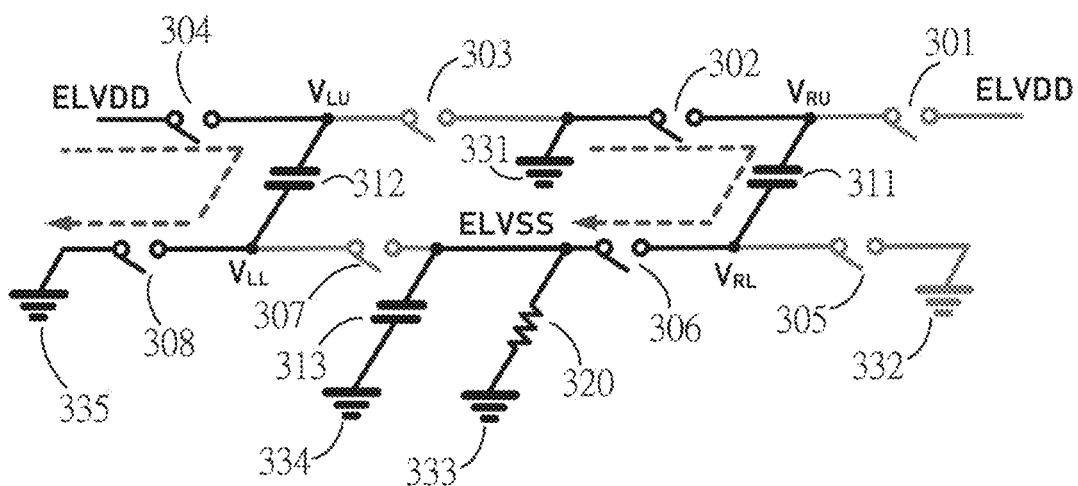
FIG. 4B is a schematic architectural diagram of the switch-capacitor converter 102 having the duty cycle on according to the present invention.

Please refer to FIG. 4B, which is the architectural diagram of the duty cycle on for the switching-capacitor converter 102 of this invention. When the duty cycle is on (D=1), the first power switch element 301, and the fifth power switch element 305 are turned off, and then the second power switch element 302, and the sixth power switch element 306 conduct. At this moment, the negative output of the switching-capacitor converter 102 releases electrical current, through the first switching capacitor 311 to ground 332. The third power switch element 303, and the seventh power switch element 307 are turned off, and then the fourth power switch element 304, and the eighth power switch element 308 conduct. At this moment, the input voltage source $V_{IN}$ charges the second switching capacitor 312, and the second switching capacitor 312 is charged through the positive drive voltage, while the first switching capacitor 311 provides energy to the negative drive voltage.

Please refer to FIG. 4B, which is the architectural diagram of the duty cycle on for the switching-capacitor converter 102 of this invention. $V_{LU}$ is the electrical voltage at the $V_{LU}$ point, and when the duty cycle is on, the $V_{LU}$ voltage reaches the electrical voltage of the positive drive voltage of the output voltage, through the conduction of the fourth power switch element 304. $V_{LL}$ is the voltage at the point $V_{LL}$ in the FIG. 4B diagram, and when the duty cycle is on, the $V_{LL}$ voltage is grounded, due to the conduction of the eighth power switch element 308. $V_{RU}$ is the voltage at the $V_{RU}$ point, and when the duty cycle is on, the $V_{RU}$ voltage is grounded due to the conduction of the second power switch element 302. $V_{RL}$ is the voltage at the $V_{RL}$ point, and when the duty cycle is on, the $V_{RL}$ voltage reaches the negative voltage of the negative drive voltage due to the conduction of the sixth power switch element 306. The negative drive voltage is the electrical voltage of the negative drive voltage point, and is the output voltage of the converter.

The above description is only the preferred embodiment of this invention and is not intended to limit the patent scope of this invention. Any equivalent changes or modifications made without departing from the spirit disclosed by this invention should be included in the following patent scope.

What is claimed is:

1. A boost converter power stage circuit, powered by an input voltage source electrically connected to a power stage ground, comprising:
   an organic light-emitting diode (OLED) power management integrated circuit unit for providing an OLED power supply;

a switched-capacitor converter, electrically connected to said OLED power management integrated circuit unit, wherein said switched-capacitor converter comprises:
   a first power switch component;
   a second power switch component;
   a third power switch component;
   a fourth power switch component;
   a fifth power switch component;
   a sixth power switch component;
   a seventh power switch component; and
   an eighth power switch component;
   a first switching capacitor;
   a second switching capacitor;
   a load capacitor;
   a fourth power stage ground;
   a load resistor;
   a third power stage ground;
   a first power stage ground;
   a second power stage ground; and
   a fifth power stage ground,
   wherein, said first power switch component being electrically connected to said second power switch component, said second power switch component being electrically connected to said third power switch component, and said third power switch component being electrically connected to said fourth power switch component, said first power stage ground being electrically situated and connected to between said second power switch component and said third power switch component, said second power stage ground being electrically situated and connected to said fifth power switch component, said fifth power switch component being electrically connected to said sixth power switch component, said sixth power switch component being electrically connected to said seventh power switch component, and said seventh power switch component being electrically connected to said eighth power switch component, said eighth power switch component being electrically connected to said fifth power stage ground, thereby outputting a negative drive voltage, one end of said first switching capacitor being electrically connected with between said first power switch, and said second power switch component, and another end of said first switching capacitor being electrically connected with between said fifth power switch component, and said sixth power switch component, one end of said second switching capacitor being electrically connected with between said third power switch component, and said fourth power switch component, and another end of said second switching capacitor being electrically connected with between said seventh power switch component and said eighth power switch component, said load resistor and said third power stage ground being electrically situated, and connected with between said sixth power switch component and said seventh power switch component, said load capacitor and said fourth power stage ground are electrically connected with between said sixth power switch component and said seventh power switch component, with an output end connected to a load capacitor, and a load resistor; and
a boost converter, electrically connected to an input voltage source as well as said switched-capacitor converter, and said OLED power management integrated circuit unit, said input voltage source being a direct current voltage source, and said boost converter serving to provide a negative voltage for use by said OLED power management integrated circuit unit, said boost converter comprising a load capacitor, said load capacitor being electrically connected to said inductor,
   wherein, said input voltage source entering said boost converter, and subsequently outputting an output voltage, an electrical value of said output voltage being higher than said input voltage source, said output voltage through said switched-capacitor converter, yields a negative drive voltage for use by said OLED power management integrated circuit unit.

2. The boost converter power stage circuit according to claim 1, further comprising a power stage ground, said power stage ground is electrically connected to said input voltage source.

3. The boost converter power stage circuit according to claim 1, wherein, said boost converter further comprises:
   a first power switch;
   a second power switch;
   a third power switch;
   a flying capacitor; and
   an inductor,
   wherein, said second power switch being electrically connected with said flying capacitor, and said inductor, said first power switch being connected with said third power switch, and said flying capacitor, and said first power switch being grounded, utilizing said flying capacitor, an electrical voltage of said inductor being boosted to double an electrical value, thereby increasing a positive voltage of said output voltage, said switched-capacitor converter carries out charging and discharging, through said flying capacitor, using said output voltage to accomplish a conversion of a negative voltage.

4. The boost converter power stage circuit according to claim 1, wherein, when a duty cycle being off, said first power switch being off, said second power switch being off, said third power switch being on, and said input voltage source outputting a voltage through said flying capacitor by either charging or discharging, boosting said voltage of said inductor to double, thereby increasing said positive voltage of said output voltage, said output voltage transmits an energy through said inductor to said organic light-emitting diode power management integrated circuit unit.

5. The boost converter power stage circuit according to claim 1, wherein, when said duty cycle being on, said first power switch and said second power switch being on, said third power switch being off, and said input voltage source outputting a voltage through said flying capacitor by either charging or discharging, said output voltage equals to said input voltage source, and said output voltage transmits an energy, through said inductor to said OLED power management integrated circuit unit.

6. The boost converter power stage circuit according to claim 1, wherein, when a duty cycle being off, said first power switch element, and said fifth power switch element being turned on, said second power switch element, and said sixth power switch element being turned off, at this moment, said input voltage source charges said first switching capacitor, said third power switch element, and said seventh power switch element being turned on, said fourth power switch element, and said eighth power switch element being turned off, at this moment, a negative output of said switched-capacitor converter releasing electrical current, passing through said second switching capacitor to ground.

7. The boost converter power stage circuit according to claim 1, wherein, when a duty cycle being on, said first power switch element, and said fifth power switch element being turned off, said second power switch element and said sixth power switch element being turned on, at this moment, said negative output of said switched-capacitor converter releasing electrical current, passing through said first switching capacitor to ground, said third power switch element, and said seventh power switch element being turned off, said fourth power switch element, and said eighth power switch element being turned on, at this moment, said input voltage source charges said second switching capacitor.

\* \* \* \* \*